Dec. 12, 1933.   K. M. WISE   1,939,155
REAR AXLE MOUNTING
Filed Dec. 26, 1931

INVENTOR.
Karl M. Wise
BY
ATTORNEYS.

Patented Dec. 12, 1933

1,939,155

UNITED STATES PATENT OFFICE 1,939,155

REAR AXLE MOUNTING

Karl M. Wise, Buffalo, N. Y., assignor to The Pierce-Arrow Motor Car Company, Buffalo, N. Y., a corporation of New York Application December 26, 1931
Serial No. 583,176

6 Claims. (Cl. 267—52)

This invention relates to a rear axle mounting for an automotive vehicle and particularly to a shock absorbing mounting for such a vehicle, and has for its principal object the provision of a rear axle mounting in which a body of resilient material is interposed between the rear axle housing and the spring hanger to prevent the transmission of noise from the axle housing through the spring to the vehicle body, and to absorb minor vibrations of the spring hanger.

It is also an object to provide a device of the class described, which will permit a limited amount of movement or resiliency between the spring hanger and the axle housing, and in which a comparatively slow rotation of the hanger relative to the axle may take place under the influence of a continued force, so that the spring hanger may rotate relative to the axle housing under the influence of different loads in the rear part of the vehicle to take up a new relative position under the influence of the immediate load. This is accomplished by creeping of the resilient material about the axle housing. Vibrations in any relative position, however, will be effectively dampened by the elastic modulus of the resilient material.

It is also an object to provide a device of the character described which is economical to manufacture, easy to install, and which will not readily get out of order in use.

An additional object is to provide a mounting for the spring hanger in which wear between the axle housing and the spring hanger will be substantially eliminated due to the imposition of the body of resilient material between these parts.

Other objects and advantages will appear as the description proceeds.

A single embodiment of the invention is illustrated in the accompanying drawing. The drawing, however, is not to be taken as limiting the invention, the scope of which is to be measured entirely by the scope of the copending claims.

Figure 1:
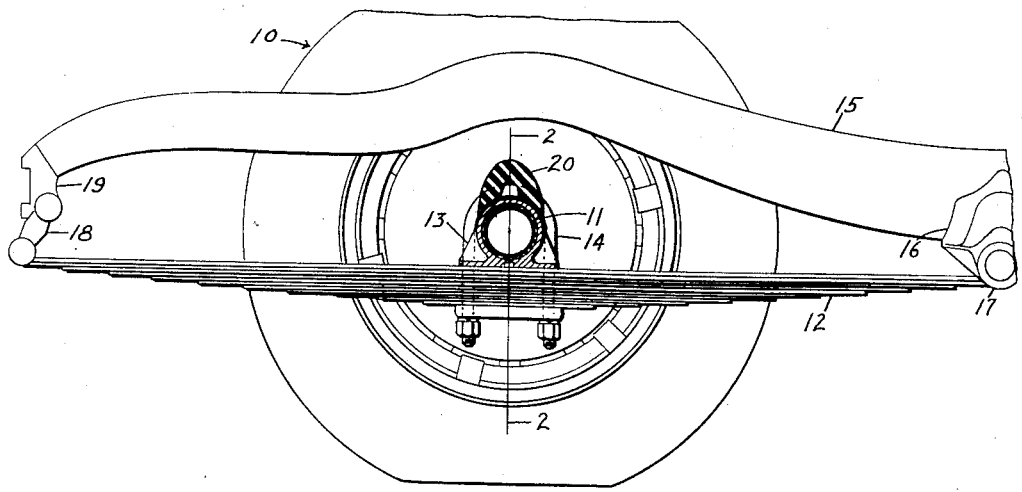
Figure 1 is an elevational view of an automobile wheel, showing a rear spring and spring hanger mounted upon the rear axle which is shown in section, and a fragmentary part of the vehicle frame supported by the spring.

Referring to the drawing in detail, the numeral 10 generally indicates an automobile wheel of conventional construction, 11 indicates a rear axle housing, and 12 indicates a rear spring secured upon the housing by means of a spring hanger 13 and U-bolts 14. The numeral 15 indicates a portion of the frame of a vehicle mounted upon the spring 12 by means of the bracket 16 and pivotal connection 17 at one end, and the shackle 18 and horn 19 at the opposite end. A resilient buffer member 20 is mounted upon the top of the spring hanger to prevent the bottom of the frame member 15 from bottoming on the spring hanger.

Figure 2:
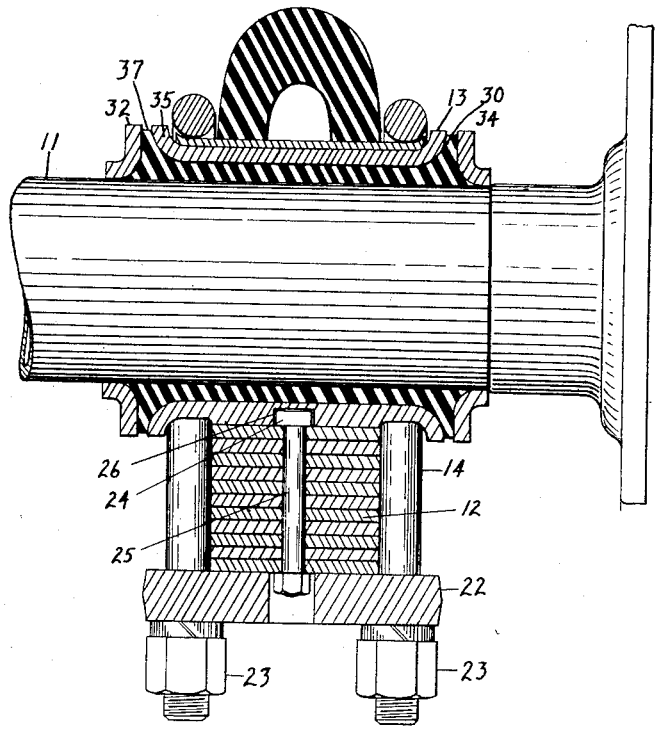
Figure 2 is a sectional view taken on the line 2—2 of Figure 1, showing a fragmentary portion of the rear axle and showing the spring and spring hanger in cross-section.

Referring to Figure 2, it will be observed that the spring 12 is secured to the hanger 13 by means of the U-bolts 14 and a bottom plate 22 held on the U-bolts by means of nuts 23, the spring being tightly clamped between the bottom of the hanger and the bottom plate 22, and also held in position by the head 24 of the center bolt 25 which projects into a depression 26 in the bottom surface of the hanger 13. As this construction forms no integral part of the present invention, it is believed that a further description is unnecessary for the purpose of this disclosure.

Again referring to Figure 2, it will be observed that the spring hanger 13 has an internal diameter materially greater than the maximum diameter of that portion of the axle housing 11 upon which the spring hanger is mounted. A cylindrical body of resilient material 30 such as vulcanized rubber is interposed between the hanger and the axle housing and compressed so that its thickness is equal to the difference between the radius of the interior surface of the hanger and the radius of the exterior surface of the axle housing. This body of resilient material then forms a cushioning member between the hanger 13 and the axle housing 11. A flanged ring member 32 of angular cross-section is slipped over the axle housing and welded, or otherwise secured, in position on the axle housing as illustrated in Figure 2. The hanger and resilient material are then placed upon the axle housing and a second flanged ring 34 similar to ring member 32 is inserted upon the axle housing and secured in position as by welding or other suitable means. It will be observed that the ends of the hanger 13 are flared outwardly as at 35, and that the distance between the rings 32 and 34 is materially greater than the maximum length of the hanger 13. Owing to the fact that the body of resilient material 30 is compressed when placed upon the axle housing, a portion of it extends outwardly at each end between the rings 32 and 34 and the hanger 13 as indicated at 37. This portion of the resilient material serves to prevent axial motion of the hanger 13 relative to the axle housing 11, and also serves to cushion the shock of any forces which may be exerted lengthwise of the axle housing. The body of resilient material may be bonded to the hanger 13 if desired, but is not bonded to the axle housing 11, although the forces of compression of the resilient material cause it to fit tightly upon the axle housing so that it will not move freely around the housing. However, if the loading condition of the rear end of the vehicle is materially altered, thereby tending to change the position of the spring 12 relative to the axle housing 11, the resilient material 30 will creep under the continued pressure about the housing 11 until the hanger has taken up a new position in which the stresses in the spring are substantially neutralized.

It will be obvious that the interposition of this body of resilient material between the spring hanger and the axle housing will prevent minor shocks imposed upon the axle housing by varying resistance in the road surfaces and varying power impulses, from being transmitted directly to the spring. It will also prevent gear and bearing noises and other small vibrations arising in the rear axle assembly from being transmitted to the spring, and thence carried directly to the body of the vehicle, thus greatly increasing the smoothness and quietness of operation of the vehicle to which the device is applied.

Having now described my invention so that others skilled in the art may clearly understand the same, what I desire to secure by Letters Patent as follows.

What I claim:

1. In combination with an axle housing and a spring hanger surrounding a portion of said axle housing, a body of resilient material interposed between said axle housing and said spring hanger, and a flanged ring secured to the axle housing at each end of the spring hanger and slightly spaced therefrom, the resilient material extending between said rings and the ends of said hanger.

2. In combination with an axle housing of an automotive vehicle, and a spring hanger mounted thereon, a pair of abutments rigidly secured on said axle housing, one at each end of said spring hanger, and a body of resilient material disposed under compression in the space between said abutments and between said axle housing and said spring hanger.

3. In combination with an axle housing of an automotive vehicle, and a spring hanger rotatably mounted thereon, a pair of abutments rigidly secured on said axle housing, one at each end of said spring hanger, and a body of resilient material disposed under compression in the space between said abutments and between said axle housing and said spring hanger to permit limited rotation of said spring hanger relative to said axle housing.

4. In combination with an axle housing of an automotive vehicle, and a spring hanger rotatably mounted thereon, a pair of abutments rigidly secured on said axle housing one at each end of said spring hanger, flared ends on said spring hanger, and a body of resilient material disposed under compression in the space between said abutments and between said axle housing and said spring hanger and extending between each flared end of said spring hanger and the adjacent abutment.

5. In combination with an axle housing of an automotive vehicle, and a spring hanger rotatably mounted thereon, a pair of abutments rigidly secured on said axle housing one at each end of said spring hanger to restrain said spring hanger against axial motion relative to said axle housing, and a resilient frictional connection between said spring hanger and said axle housing comprising a cylindrical body of soft rubber disposed under compression in the space between said abutments and between said axle housing and said spring hanger.

6. In combination with a cylindrical axle housing and a spring hanger surrounding said axle and rotatable relative thereto, a pair of abutments rigidly secured on said axle housing adjacent to the ends of said spring hanger, a body of resilient material interposed between said axle housing and spring hanger and between said abutments, said resilient material being compressed to a relatively thin walled section whereby said hanger will have a limited freedom of motion relative to said housing by reason of the resiliency of said material and a resisted motion relative to said housing by the creeping of said material about the housing.

KARL M. WISE.